(12) United States Patent
Kosaka et al.

(10) Patent No.: US 7,647,806 B2
(45) Date of Patent: Jan. 19, 2010

(54) DRIVE

(75) Inventors: Akira Kosaka, Yao (JP); Yoshie Shimizu, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 55 days.

(21) Appl. No.: 11/294,051

(22) Filed: Dec. 5, 2005

(65) Prior Publication Data

US 2006/0120708 A1 Jun. 8, 2006

(30) Foreign Application Priority Data

Dec. 6, 2004 (JP) .............................. 2004-352578
Nov. 14, 2005 (JP) .............................. 2005-328616

(51) Int. Cl.
*B21J 7/12* (2006.01)
*B21C 51/00* (2006.01)
*B21D 51/00* (2006.01)

(52) U.S. Cl. .............................. 72/431; 72/21.4; 72/712

(58) Field of Classification Search .................. 60/527, 60/528, 529; 72/429, 431, 20.2, 21.4, 441, 72/712; 396/452, 502; 29/751, 753, 863
See application file for complete search history.

(56) References Cited

U.S. PATENT DOCUMENTS

| 3,280,550 | A | * | 10/1966 | Cassidy | ........................ 60/528 |
| 4,275,561 | A | * | 6/1981 | Wang | ........................... 60/527 |
| 4,824,276 | A | * | 4/1989 | Ginell | ......................... 403/213 |
| 6,516,146 | B1 | * | 2/2003 | Kosaka | ......................... 396/55 |
| 2001/0022688 | A1 | * | 9/2001 | Kosaka et al. | ............... 359/557 |
| 2001/0026687 | A1 | * | 10/2001 | Kosaka et al. | ............... 396/452 |
| 2002/0113499 | A1 | * | 8/2002 | von Behrens et al. | ......... 310/12 |

FOREIGN PATENT DOCUMENTS

JP        2001-170900 A        6/2001

* cited by examiner

*Primary Examiner*—Dana Ross
*Assistant Examiner*—Teresa M Bonk
(74) *Attorney, Agent, or Firm*—Sidley Austin LLP

(57) ABSTRACT

A drive for operating a movable part with respect to a fixed part includes: a driving member having a linear shape and being made of a shape-memory alloy; and a crimp terminal for holding one end of the driving member at the fixed part or the movable part. At least a part to which the driving member is crimped in the crimp terminal is made of stainless steel.

12 Claims, 10 Drawing Sheets

F I G . 2
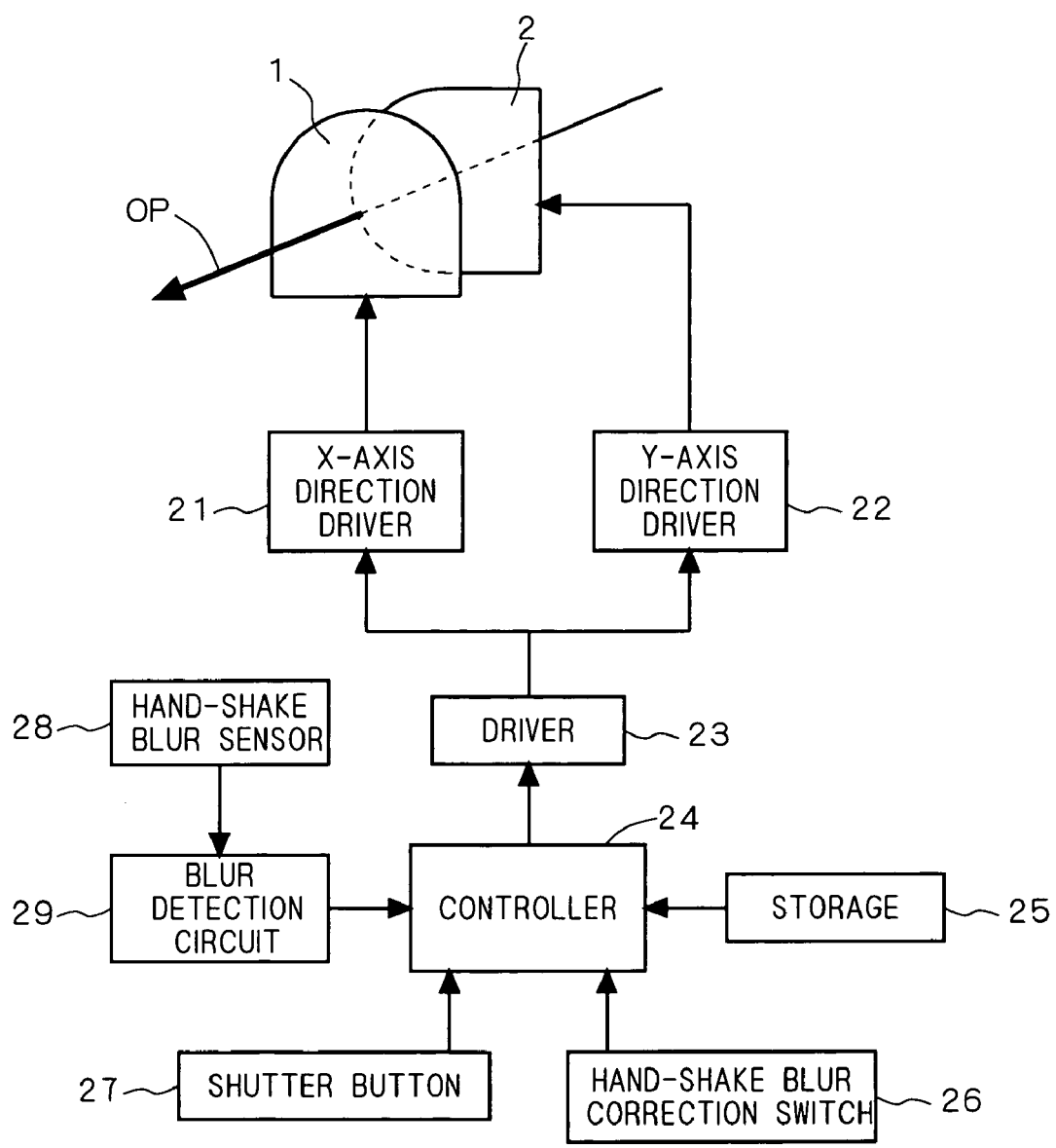

F I G . 3
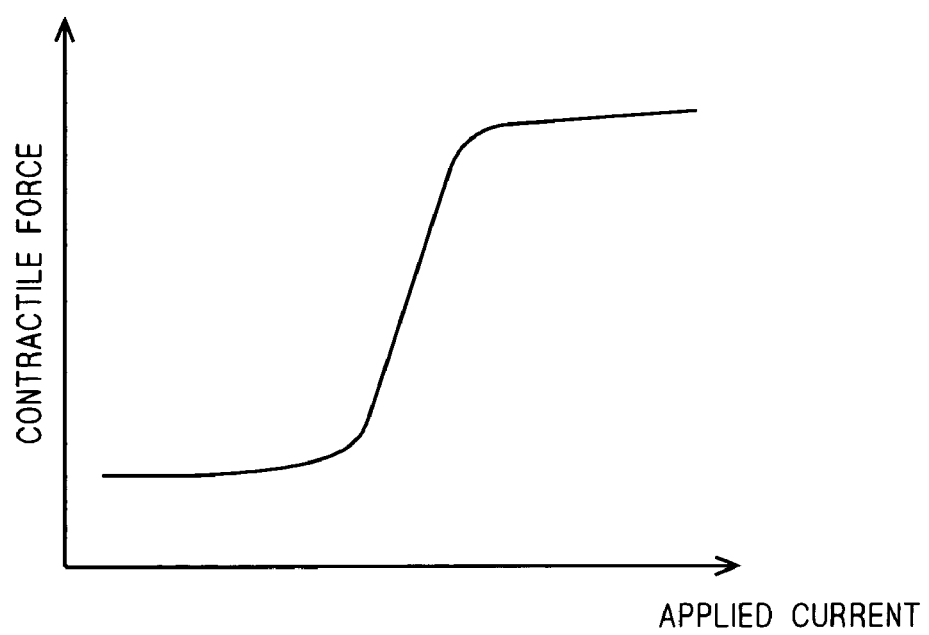

FIG. 9
| CRIMP TERMINAL MATERIAL | ① | ② | ③ | AVERAGE OF MAXIMUM HOLDING POWER (N) |
|---|---|---|---|---|
| OXYGEN-FREE COPPER | 0.81 | 0.83 | 0.78 | 0.81 |
| SUS430 | 1.24(*) | 1.52(*) | 1.54(*) | 1.43(*) |
| SUS304 | 1.46(*) | 1.29(*) | 1.56(*) | 1.44(*) |
FIG. 10
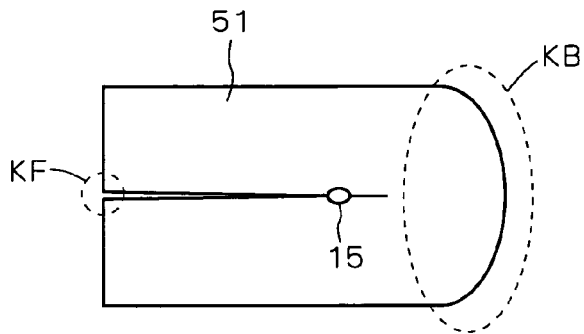
FIG. 11
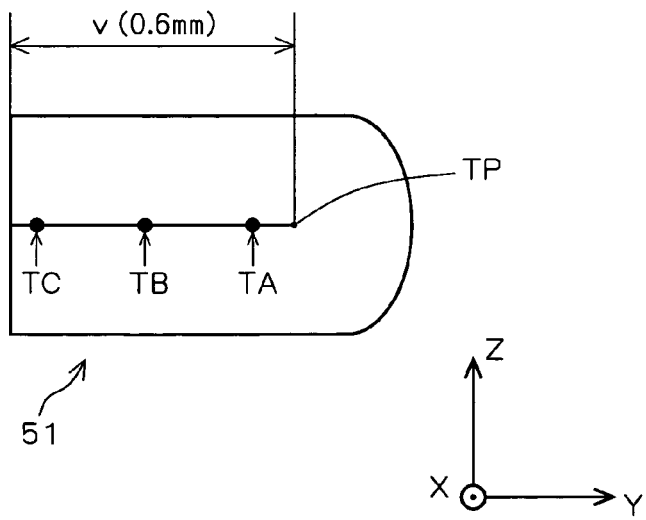

| CAULKING POSITION | ① | ② | ③ | AVERAGE OF MAXIMUM HOLDING POWER (N) |
|---|---|---|---|---|
| TA | 1.31(*) | 1.32(*) | 1.21(*) | 1.28(*) |
| TB | 1.23 | 1.28(*) | 1.29(*) | 1.27(*) |
| TC | 1.1 | 0.71 | 1.23(*) | 1.01 |

FIG. 16
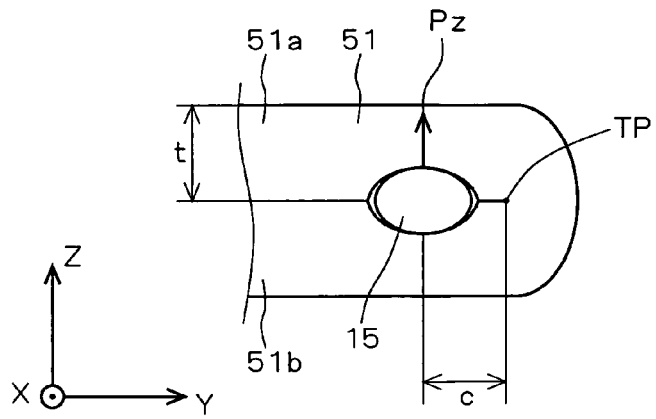
FIG. 17
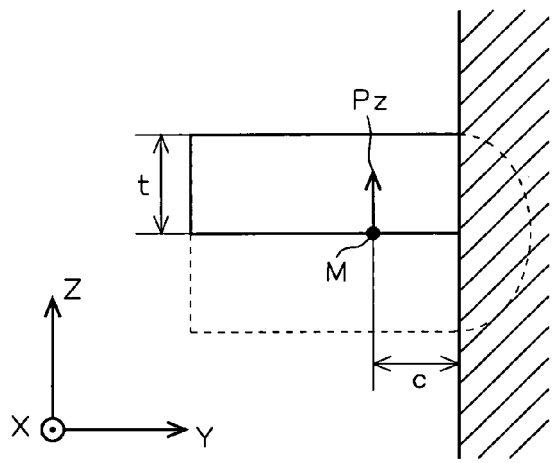
FIG. 18
| CRIMP TERMINAL | ① | ② | ③ | AVERAGE OF MAXIMUM HOLDING POWER (N) |
|---|---|---|---|---|
| SUS304 | 1.23 | 1.28(*) | 1.29(*) | 1.27(*) |
| NICKEL-PLATING | 1.26(*) | 1.33(*) | 1.29(*) | 1.29(*) | y
DRIVE

This application is based on application Nos. 2004-352578 and 2005-328616 filed in Japan, the contents of which are hereby incorporated by reference.

BACKGROUND OF THE INVENTION

1. Field of the Invention

The present invention relates to a drive (which is also called a driving device) using a shape-memory alloy.

2. Description of the Background Art

There are shape-memory alloys which have the property of changing their shapes with temperature. Also, there is a well-known drive that has a drive mechanism composed of a drive member of rod-like (or linear) shape-memory alloy (which is also referred to as a shape-memory member) and that achieves drive by controlling the amount of current applied to the shape-memory member (Japanese Patent Application Laid-open No. 2001-170900). In this drive, the ends of the shape-alloy member are crimped by crimp terminals to a moving part of the drive.

Use of such a drive as disclosed in Japanese Patent Application Laid-open No. 2001-170900 in environments that require agility in operation necessitates improvement in the response speed of the drive by reducing the diameter (sectional diameter) of the shape-memory member.

However, a smaller diameter of the shape-memory member results in lower holding power provided by crimping between the shape-memory member and the crimp terminal, thereby causing a problem of inability to stand operating environments as above described.

Besides, in order to ensure stable operation with the drive as disclosed in Japanese Patent Application Laid-open No. 2001-170900 in operating environments that require a large driving force, it is generally required to improve holding power between the shape-memory member and the crimp terminal.

SUMMARY OF THE INVENTION

It is therefore an object of the present invention to provide a drive which increases holding power by crimping between a shape-memory member and a crimp terminal, and can be driven stably even in environments that a large holding power is required.

According to a first aspect of the present invention, a drive for operating a movable part with respect to a fixed part, includes: a driving member having a linear shape and being made of a shape-memory alloy; and a crimp terminal for holding one end of the driving member at the fixed part or the movable part, wherein at least a part to which the driving member is crimped in the crimp terminal is made of stainless steel.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows a general outline of control of hand-shake blur correction units;

FIG. 3 shows the relationship between current applied to a shape-memory member and contractile force caused by the shape-memory member;

FIG. 9 shows the maximum holding power with changes in the material of the caulking part;

FIG. 10 is a cross-sectional view showing the caulking part after crimping;

FIG. 11 shows insertion positions of the shape-memory member;

FIG. 16 is a cross-sectional view showing the state of the caulking part;

FIG. 17 shows a case where the caulking part is modeled as a cantilever; and

FIG. 18 shows the maximum holding powers in the case of nickel-plating the caulking part of the crimp terminal.

DESCRIPTION OF THE PREFERRED EMBODIMENTS

Hereinbelow, a preferred embodiment of the present invention will be described with reference to the drawings.

Figure 1:
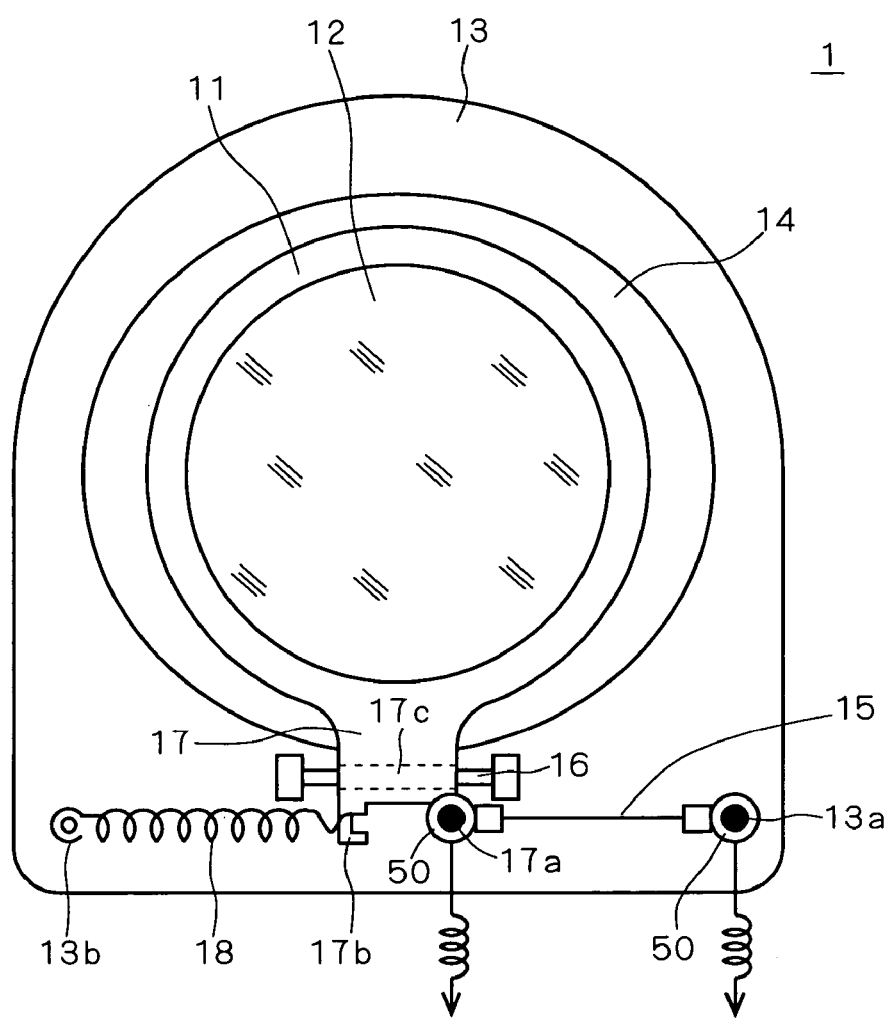
FIG. 1 is a plan view showing the structure of a hand-shake blur correction unit according to a first preferred embodiment.

FIG. 1 is a plan view showing the structure of a hand-shake blur correction unit 1 in a hand-shake blur correction device 10 according to the preferred embodiment of the present invention. The hand-shake blur correction device 10 is incorporated into an image capturing apparatus such as a digital camera or a mobile phone, and has a function of preventing degradation of a captured image due to hand-shake blur. The hand-shake blur correction unit 1 shown in FIG. 1 is a drive (driving device) which makes hand-shake blur corrections in the X-axis direction. The hand-shake blur correction device 10 also includes another hand-shake blur correction unit 2 which is identical in structure to the hand-shake blur correction unit 1 and makes hand-shake blur corrections in the Y-axis direction. The above correction units 1 and 2 for the X- and Y-axis directions, respectively, are arranged side by side on the same optical axis OP between a lens (not shown) and an imaging element (not shown) within a lens barrel (see FIG. 2). Such a configuration allows hand-shake blur corrections in the XY plane perpendicular to the optical axis OP.

Next, internal components in the hand-shake blur correction unit 1 will be described in detail.

The hand-shake blur correction unit 1 is configured such that a correction lens 12 held by a holding frame 11 is located at an opening 14 of a fixed part 13.

Then, a hollow portion 17c of an arm 17 formed at one end of the holding frame 11 is slidably mounted around a guide bar 16 that is parallel to the x-axis direction. That is, the holding frame 11 is equivalent to a moving part in contrast to the fixed part 13.

Further, a shape-memory member 15 which will be described later is installed between a pin 13a provided on the fixed part 13 and a pin 17a provided at the edge of the arm 17 of the holding frame 11. More specifically, crimp terminals 50 are attached by crimping on both ends of the shape-memory member 15. The crimp terminal 50 attached on one end is fixed by the pin 13a to the fixed part 13, and the crimp terminal 50 on the other end is fixed by the pin 17a to the arm 17 of the holding frame 11.

Further, an elastic member 18 (e.g., a coil spring) is installed between a pin 13b provided on the fixed part 13 and a hook 17b provided at the edge of the arm 17 of the holding frame 11.

Now, the shape-memory member 15 will be described in detail.

FIG. 3 shows the relationship between current applied to the shape-memory member 15 of shape memory alloy (hereinafter abbreviated also as "SMA") and contractile force caused by the shape-memory member 15.

The shape-memory member 15 is a rod-like member made of SMA and serves as a drive member that drives the moving part with respect to the fixed part.

SMA has the property of being restored to its predetermined and prestored contracted shape (hereinafter also referred to as a memory state) when reaching a predetermined temperature (hereinafter also referred to as a transformation temperature) by heating upon application of current.

More specifically, as shown in FIG. 3, as the amount of applied current increases and the temperature of SMA rises, the contractile force increases because SMA contracts to return to its memory state. On the other hand, as the amount of applied current decreases and the temperature of SMA drops, the contractile force decreases and SMA becomes easily deformed (becomes soft).

In experiments described in this specification, two kinds of shape-memory members 15a and 15b prepared by different methods were used as the shape-memory member 15. The two kinds of shape-memory members 15a and 15b prepared by different methods will now be described.

The shape-memory member 15 is manufactured by a normal method of performing (1) hot working, (2) cold wire drawing, (3) shaping, and (4) shape memory heat treatment in this order on an NiTiCu shape-memory alloy ingot. The shape-memory members 15a and 15b are manufactured by employing the same method for the processes (1) to (3) and different methods for the process (4) in the manufacture. Specifically, the hot working is performed on the NiTiCu alloy ingot. Next, while properly performing process annealing, the cold drawing process is performed, thereby manufacturing an NiTiCu alloy wire having a diameter D=38 μm. In the manufacturing process (4) of the shape-memory member 15a, a method of setting the temperature of the shape-memory heat treatment to 570° C. and holding the member at the shape-memory heat treatment for 0.5 minute is used. On the other hand, in the manufacturing process (4) of the shape-memory member 15b, a method of setting the temperature of the shape-memory heat treatment to 550° C. and holding the member at the temperature of the shape-memory heat treatment for 0.5 minute is used. As described above, the shape memory members 15a and 15b are manufactured at the different shape memory heat process temperatures in the manufacturing process (4).

Next, a driving principle using the shape-memory member 15 will be described in detail.

In the hand-shake blur correction unit 1 of FIG. 1 employing the shape-memory member 15 of SMA, an elastic force pulling in the negative X-axis direction which is caused by the elastic member 18, and a contractile force in the positive X-axis direction which varies according to the amount of heating caused by current applied to the shape-memory member 15, act on the holding frame 11. That is, the position of the holding frame 11 can be controlled by controlling the amount of current applied to the shape-memory member 15 thereby to change the contractile force.

More specifically, if no hand-shake blur correction is made (i.e., the holding frame 11 is in its reference (standby) position), the amount of current applied to the shape-memory member 15 may be controlled to cause a contractile force that is equivalent to the elastic force caused by the elastic member 18 in the reference position. In the case of shifting the holding frame 11 in the positive X-axis direction from the reference position, the amount of applied current may be increased to increase the contractile force. On the contrary, in the case of shifting the holding frame 11 in the negative X-axis direction from the reference position, the amount of applied current may be reduced to reduce the contractile force.

Within a moving range of the holding frame 11 in the hand-shake blur correction unit 1, the elastic member 18 is always placed in such a way that it is stretched from its natural length and thus will never be of its natural length or less.

The hand-shake blur correction unit 2 for hand-shake blur correction in the Y-axis direction also has the same driving principle as that of the hand-shake blur correction unit 1. That is, the hand-shake blur correction unit 2 is such that the hand-shake blur correction unit 1 for the X-axis direction is rotated counterclockwise 90 degrees and placed within the lens barrel.

Hereinbelow, a control system for the hand-shake blur correction units 1 and 2 will be described.

FIG. 2 shows a general outline of the control system for the hand-shake blur correction units 1 and 2 according to the preferred embodiment of the present invention. As shown in FIG. 2, a hand-shake blur sensor 28 is, for example, a gyro sensor that detects hand-shake blur, and its output signal is amplified and subjected to filtering in a blur detection circuit 29 and fed to a controller 24.

The controller 24 is composed of CPU which executes a predetermined control program stored in a storage 25 to control the entire execution of hand-shake blur correction.

The storage 25 stores data on current applied to the shape-memory member 15 corresponding to the amount of hand-shake blur correction. This current data is determined by the relationship between a premeasured value of current applied to the shape-memory member 15 and the contractile force of the shape-memory member 15 and by the amount of hand-shake blur correction corresponding to a predetermined contractile force.

The controller 24, based on the current data, generates a control command value for driving the hand-shake blur correction units 1 and 2 to cancel out hand-shake blur detected by the blur detection circuit 29, and outputs it to a drive circuit (driver) 23. The driver 23 drives an X-axis direction driver 21 and a Y-axis direction driver 22 on the basis of the control command value from the controller 24. Thereby, the hand-shake blur correction units 1 and 2 are driven to their optimum positions to correct hand-shake blur.

A hand-shake blur correction switch 26 is a switch for selecting whether or not to make hand-shake blur corrections during image taking, whose role in the ON state is to execute hand-shake blur correction and whose role in the OFF state is not to execute hand-shake blur correction.

A shutter button (also referred to as a release button) 27 is a two-step push button. With a half-press of the shutter button 27 (also referred to as a state S1), the controller 24 starts AF and AE operations. With a full-press of the shutter button 27 (also referred to as a state S2), the controller 24 performs an exposure operation for taking a recording image.

Further, with the hand-shake blur correction switch 26 in its ON state and in the half-pressed state S1 (i.e., in response to a signal detecting the half-pressed state S1), the controller 24 considers that a command indicating the start of hand-shake blur correction has been inputted, and starts hand-shake blur correction. It should be noted that the invention is not limited thereto, and the hand-shake blur correction may start with any input operation other than the shutter button 27. Or, the hand-shake blur correction may start not with the input of a command indicating the start of preparation for image taking (in the half-pressed state S1), but with the input of a command indicating the start of image taking (in the full-pressed state S2).

Figure 4:
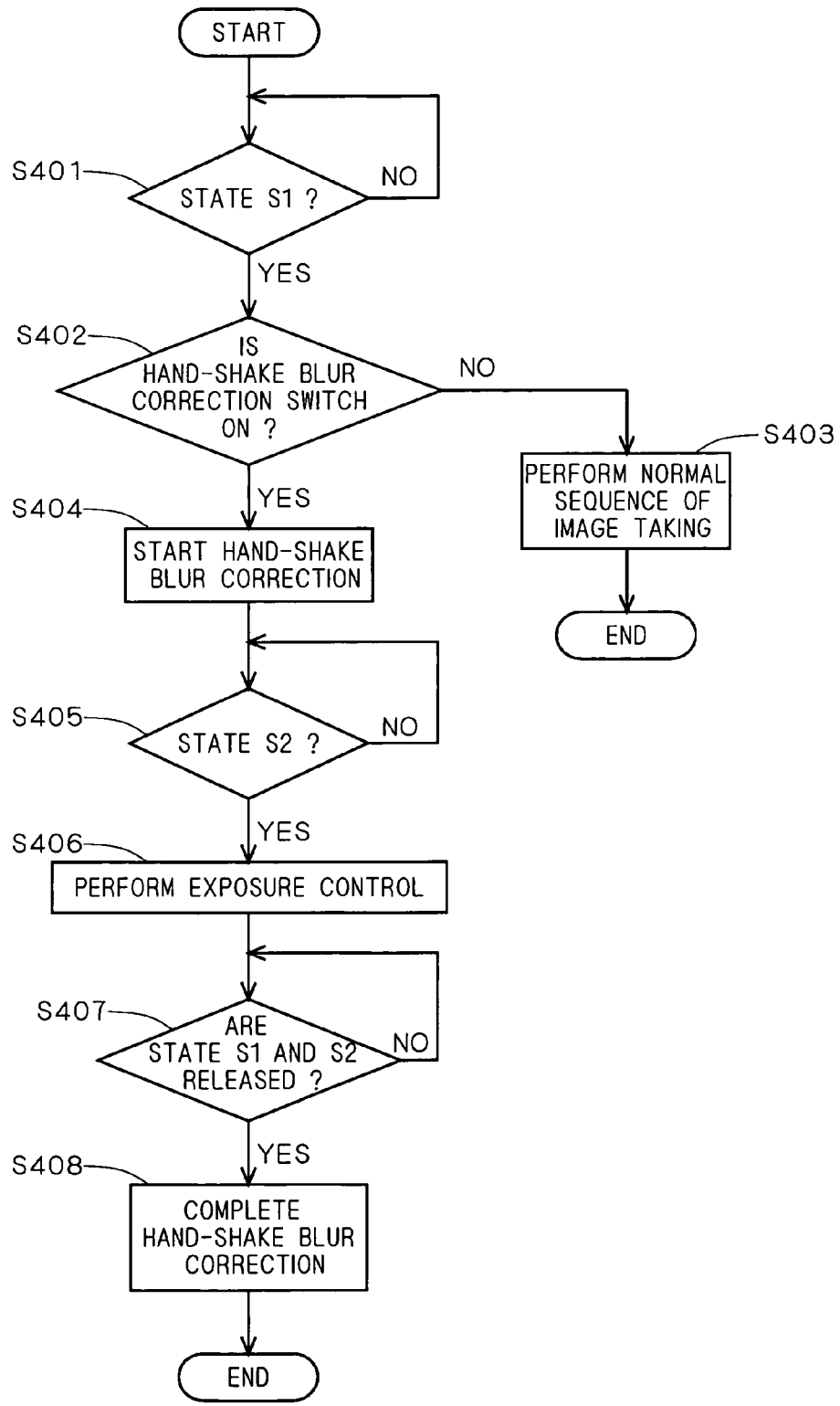
FIG. 4 is a flow chart showing the operation of hand-shake blur correction.

Next, a flow of the operation of hand-shake blur correction will be described with reference to FIG. 4.

First, we wait for a start command signal that indicates the start of preparation for image taking with a half-press of the shutter button 27 (step S401). With input of the start command signal (state S1), it is checked whether the hand-shake blur correction switch 26 is in the on or off state (step S402).

If the hand-shake blur correction switch 26 is off, a normal image taking operation without hand-shake blur correction is performed (step S403), and the process is completed. If the hand-shake blur correction switch 26 is on, hand-shake blur correction is started (step S404).

More specifically, when the hand-shake blur sensor 28 detects hand-shake blur, the controller 24 starts to control current applied to the shape-memory member 15, on the basis of the control command value it generated, thereby to start hand-shake blur correction.

Further in this condition, we wait for another signal that indicates the start of image taking with a full-press of the shutter button 27 (step S405). With a full-press of the shutter button 27, an exposure operation is started (step S406).

Then, we wait for the release of the shutter button 27 in the full-pressed state S2 and the half-pressed state S1 (step S407). Upon release of the shutter button 27, the hand-shake blur correction comes to an end (step S408), and the entire process is completed.

<Holding Power>

Now, in order to use the shape-memory member 15 of SMA as a drive mechanism of the aforementioned hand-shake blur correction unit (drive) 1 that requires agility in operation, improvement in the response speed of the hand-shake blur correction unit 1 is necessary.

Hereinbelow, a technique for improving the response speed of the hand-shake blur correction unit 1 will be described in detail.

The driving principle of the hand-shake blur correction unit 1 utilizes the property of SMA that changes its shape with temperature. Thus, in order to improve the response speed of the hand-shake blur correction unit 1, it is necessary to control the temperature of the shape-memory member 15 of SMA with agility.

The temperature control is carried out in significantly different ways depending on whether the temperature is increased or decreased. Specifically, as a way of increasing the temperature of the shape-memory member 15, there are human-induced methods, such as increasing the amount of applied current, which can be easily implemented. On the other hand, as a way of reducing the temperature of the shape-memory member 15, there is no direct human-induced method, and heat dissipation of the shape-memory member 15 itself is one of the chief elements in reducing the temperature of the shape-memory member 15. That is, one of the ways of quickly reducing the temperature of the shape-memory member 15 for agile temperature control is to improve the heat dissipation performance of the shape-memory member 15 itself.

The heat dissipation performance of a rod-like (linear) object is generally dominated by the surface area of the object in relation to the mass. Thus, the ratio of the surface area to the mass can be increased by reducing the diameter (sectional diameter) of a rod-like (linear) object, which allows improvement in the heat dissipation performance.

From this, reducing the diameter of the shape-memory member 15 is an effective way to achieve agile temperature control of the shape-memory member 15, i.e., to improve the response speed of the hand-shake blur correction unit 1.

Figure 5:
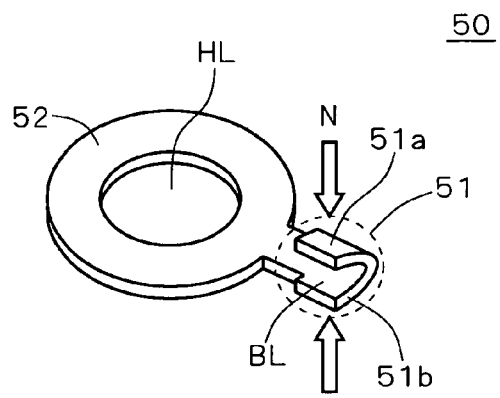
FIG. 5 shows a crimp terminal used in the first preferred embodiment before crimping.
Figure 6:
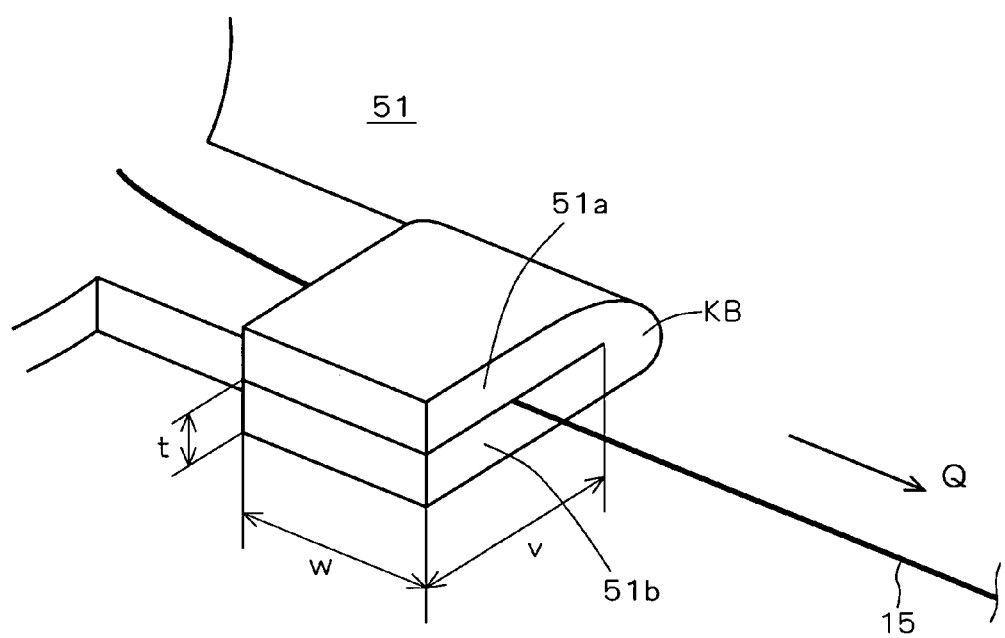
FIG. 6 is an enlarged view of a crimped caulking part.
Figure 7:
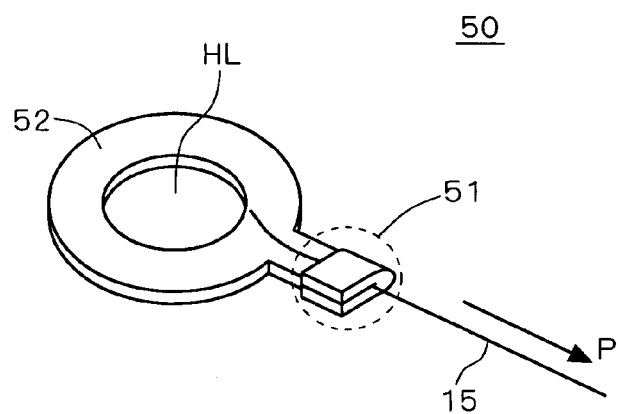
FIG. 7 shows a crimp terminal used in the first preferred embodiment after crimping.

However, if the hand-shake blur correction unit 1 is driven using the small-diameter shape-memory member 15, there occurs the problem that the shape-memory member 15 may come out from the crimp terminal 50. This is because the power of the crimp terminal 50 for holding the shape-memory member 15 by crimping (which power is hereinafter also referred to as the "holding power") becomes less than a pulling power applied by the operation of the hand-shake blur correction unit FIG. 5 shows the structure of the crimp terminal 50 before crimping, used in the preferred embodiment of the present invention. FIG. 6 is an enlarged view of a crimped caulking part 51. FIG. 7 shows the structure of the crimp terminal 50 after crimping, used in the preferred embodiment of the present invention. Hereinbelow, we discuss crimping with reference to FIGS. 5 to 7.

As shown in FIG. 5, the crimp terminal 50 includes an U-shaped (or L-shaped) caulking part 51 which holds the shape-memory member 15 by crimping; and a mounting part 52 having a hole HL which is fitted with the pin 13a provided on the fixed part 13 or the pin 17a provided at the arm 17. The caulking part 51 has a pair of sandwiching parts 51a and 51b (see FIG. 6). The pair of sandwiching parts 51a and 51b is formed by bending a plate member having a thickness t and a width w.

The shape-memory member 15 is pressurized in the N direction (the direction perpendicular to the facing surface of the sandwiching parts 51a and 51b) in a state where the shape-memory member 15 is inserted in the U-shaped part of the caulking part 51, specifically, in a part where the pair of sandwiching parts 51a and 51b face each other. By the pressurization, a bent portion KB of the caulking part 51 is plastic-deformed, and the shape-memory member 15 is held by crimping of the caulking part 51 of the crimp terminal 50 (specifically, a sandwich face BL of the pair of sandwiching parts 51a and 51b) (FIG. 7). As shown in FIG. 6, in the crimp state, the shape-memory member 15 is crimped in a state where it is sandwiched by the pair of sandwiching parts 51a and 51b in the width w in a stretch direction Q (in the caulking part 51) of the shape-memory member 15. In FIG. 6, a nodal line between the plane perpendicular to the stretch direction Q (one end face of the caulking part 51) and the sandwich face BL is indicated as a range v (also referred to as a "sandwich range") in which the shape-memory member 15 can be sandwiched by the pair of sandwiching parts 51a and 51b, and the shape-memory member 15 is sandwiched in a center part of the sandwich range v.

It should be noted that, in FIG. 7, there should be no shift in the relative positions of the shape-memory member 15 and the caulking part 51 when the shape-memory member 15 is pulled in a stretch direction Q. That is, such a shift should not be caused during drive of the hand-shake blur correction unit 1. A tensile force exerted when a shift occurs is equivalent to the maximum holding power of the caulking part 51 for holding the shape-memory member 15.

<Relationship between Holding Power and Terminal Material>

Next, the relationship between the maximum holding power and the material of terminal will be described in detail.

Figure 8:
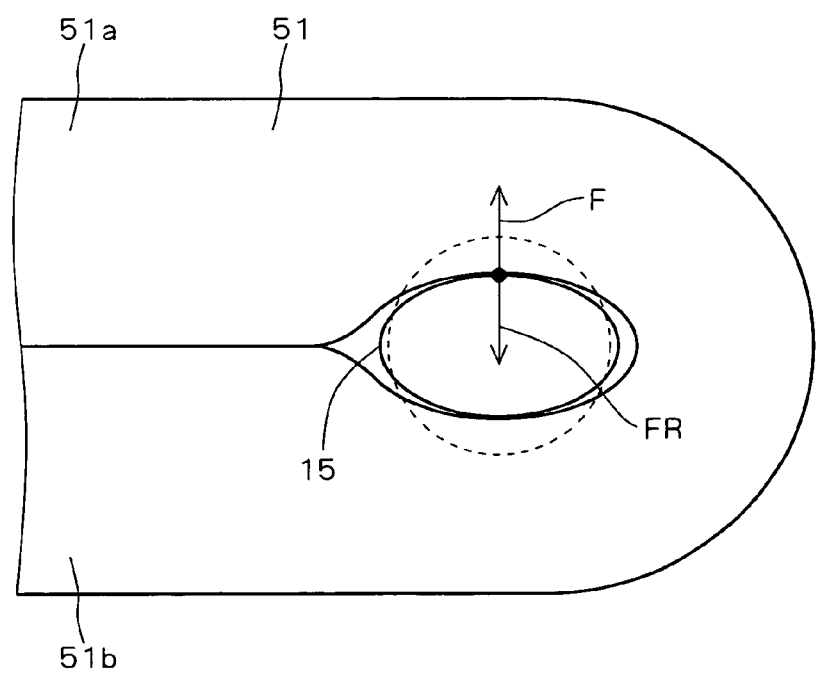
FIG. 8 is a enlarged cross-sectional view showing a caulking part after crimping.

FIG. 8 is an enlarged cross-sectional view of the caulking part 51 after crimping. FIG. 8 shows that the shape-memory member 15 is elastically deformed, being distorted into an oval cross-sectional shape from its original approximately circular cross-sectional shape (shown by the broken line) before crimping.

As shown in FIG. 8, the maximum holding power is mainly determined by the product of a force F caused by the elastic deformation of the shape-memory member 15 at a contact area with the caulking parts 51, and a static friction coefficient μ at the contact area (which product is equivalent to the maximum static friction force).

Thus, one way to increase the maximum holding power is to increase the force F caused by the elastic deformation of the shape-memory member 15 of SMA.

In order to increase the force F caused by the elastic deformation of the shape-memory member 15, the amount of the elastic deformation of the shape-memory member 15 should be increased. Also, in order to increase the amount of the elastic deformation, it is considered that the caulking parts 51 should be made of a material which is harder than any conventionally used material, i.e., a material with a higher Young's modulus E, so that the shape-memory member 15 crimped into the caulking parts 51 is further greatly distorted (more simply, becomes more flat).

As materials of crimp terminals, copper-base materials are widely used in general practice from the viewpoint of electrical conductivity, workability, or the like. For example, oxygen-free copper is generally used as the material of a crimp terminal. In contrast, this preferred embodiment has employed materials with high Young's moduli E for the caulking parts 51 of the crimp terminals 50 and has tried to measure the maximum holding power.

Since the Young's modulus E of oxygen-free copper conventionally used as the material of crimp terminals is approximately 120 GPa (Gigapascal), the preferred embodiment of the present invention has employed stainless steel (with a Young's modulus E of approximately 200 GPa) as the material with a high Young's modulus E.

Stainless steel is an iron-base alloy containing a high percentage of chromium (Cr) singly or containing a high percentage of Cr and nickel (Ni) for the purpose of corrosion resistance. The designation of "SUS", which is generally used for stainless steel in Japan, is the expression for stainless steel on the Japanese Industrial Standards (JIS).

FIG. 9 shows the maximum holding power values in the cases where the caulking parts 51 are made of oxygen-free copper, ferritic stainless steel (SUS430), and austenitic stainless steel (SUS304), respectively. Experiments (measurement tests for static load) have been made three times for each material.

Concretely, as a rule, the static load is obtained as the maximum holding power, which is applied when a tensile force (static load) is applied across the caulking part 51 and the shape-memory member 15 and a relative shift (that is, "slip-out") occurs between the caulking part 51 and the shape-memory member 15.

However, since the diameter of the shape-memory member 15 is very small and the shape-memory member 15 is relatively easily broken, there are cases that the shape-memory member 15 is broken before the relative shift (slip-out) occurs. In such a case (the case where the shape-memory member 15 is broken before the slip-out occurs), exceptionally, the static load at the time point of the break is obtained as the maximum holding power. In FIG. 9 and the like, the value of the maximum holding power in such a case is indicated with the mark (*). Further, in FIG. 9 and the like, the average of the maximum holding power values is indicated with the mark (*) in the case where the shape-memory member 15 is broken in at least two of three experiments.

The caulking part 51 of the crimp terminal 50 used in the experiments have a thickness t of 0.2 mm and a width w of 1.0 mm (see FIG. 6). In the experiments, the shape-memory member 15a having a diameter of 38 μm is used, and the shape-memory member 15a is crimped in the center of the sandwich range v=0.6 mm.

As shown in FIG. 9, if the caulking parts 51 are made of oxygen-free copper, the average of the maximum holding power value is 0.81 N. On the other hand, when the material of the caulking parts 51 is changed to SUS430 and SUS304, the averages of the maximum holding power values are increased to 1.43N (*) and 1.44N (*), respectively.

The maximum holding power values when the material of the caulking parts is changed to SUS430 or SUS304 are not the maximum holding powers in strict meaning as described above, but are the static loads applied when the shape-memory member 15a is broken in the experiments. It can be considered that when the material of the caulking parts 51 is changed to SUS430 and SUS304, the holding powers of 1.43N or more and 1.44N or more, respectively, act between the caulking part 51 and the shape-memory member 15.

This result shows that the use of stainless steel with higher Young's moduli E than copper-base materials as the material of the caulking parts 51 can improve the holding power by crimping.

In fact, actual use of the stainless steel SUS430 or SUS304 for the caulking parts 51 of the crimp terminals 50 in the preferred embodiment of the present invention resulted in stable drive operations of the hand-shake blur correction unit 1.

From the above results, in order to use the shape-memory member 15 of SMA as the drive mechanism of the hand-shake blur correction unit 1 that requires agility in operation, it is preferable to use stainless steel as the material of the caulking parts 51 of the crimp terminals 50 and thereby to improve the holding power.

<Caulking Position>

The caulking position of the shape-memory member 15 will be described in detail.

FIG. 10 is a cross-sectional view when the caulking part 51 bent by crimping is cut along an imaginary plane perpendicular to the stretch direction Q of the shape-memory member 15, that is, a cross-sectional view showing a bent state of the caulking part 51 (also referred to as a "bent section").

As described above, pressure is applied in the N direction to the shape-memory member 15 in a state where the shape-memory member 15 is inserted to the center portion of the sandwich range v of the caulking part 51 (see FIG. 5), and the shape-memory member 15 is fixed (held) (see FIG. 6).

Since the bent portion KB recovers the shape by the elastic deformation amount after the crimp force is cancelled, a gap is created at an open end KF of the pair of sandwiching parts 51a and 51b (see FIG. 10). It is considered that a change occurs in the holding power in accordance with the crimp position (also referred to as "sandwiched position" or "caulking position") in the shape-memory member 15 in the sandwich range v due to the influence of the shape recovery of the elastic deformation amount.

Figures 12, 13:
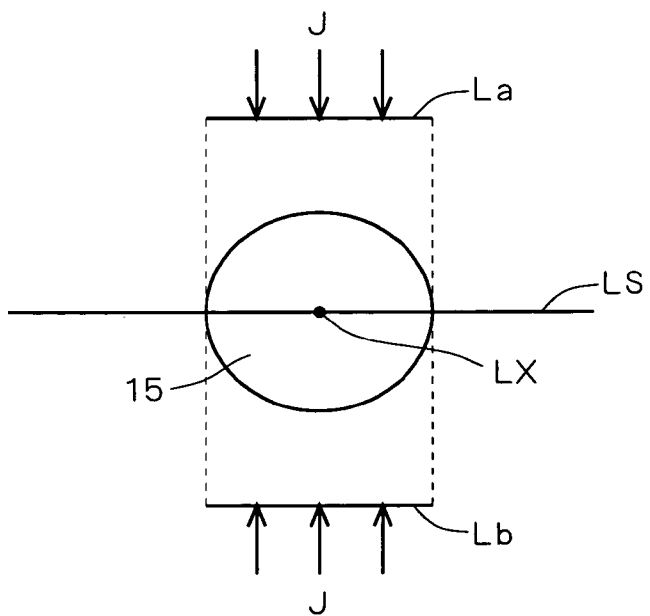
FIG. 12 shows the maximum holding powers in different insertion positions of the shape-memory member crimped.
FIG. 13 shows projection planes of the side faces of the shape-memory member having an almost circular cylinder shape.

FIG. 11 shows various crimp positions (TA, TB, and TC) of the shape-memory member 15 in the bent section. FIG. 12 shows the maximum holding powers in the various crimp positions of the shape-memory member 15 and shows values obtained when the experiment (static load measurement test) was conducted three times in each of the positions. The material of the caulking part 51 of the crimp terminal 50 used in the experiment is SUS304, and the caulking part 51 has a thickness t of 0.2 mm and a width w of 1.0 mm. In the experiments shown in FIG. 12, the shape-memory member 15b having the diameter of 38 μm is used.

As shown in FIG. 12, the average of the maximum holding power values in the case where the shape-memory member 15 is crimped in the position TA (FIG. 11) moved by 0.1 mm in the Y-axis negative direction from the root position (also referred to as the inner bent point (folding point)) TP on the bent part KB side in the sandwich range v of 0.6 mm is 1.28N (*). The average of the maximum holding power values in the case where the shape-memory member 15 is crimped in the central position TB (FIG. 11) moved by 0.3 mm in the Y-axis negative direction from the root position TP on the bent part KB side in the sandwich range v is 1.27N (*). In contrast, the average of the maximum holding power values in the case where the shape-memory member 15 is crimped in the position TC moved by 0.5 mm in the Y-axis negative direction from the root position TP on the bent part KB side in the sandwich range v is 1.01N.

Although slip-out occurs at the static load of 1.01N in the position TC, the static load heavier than that can be applied in the positions TA and TB.

From the above result, it is understood that the holding power by crimping changes according to the caulking position of the shape-memory member 15, concretely, when the caulking position is close to the open end KF, the holding power by crimping deteriorates. It is consequently understood that, to obtain a desired holding power, preferably, the shape-memory member 15 is crimped so as to be positioned between the positions TP and TB in the bent section (see FIG. 11) of the plate member. Herein, the position TP is a root position of the bent part of the plate member, and the position TB is an intermediate position (center position) between the root position TP of the bent portion of the plate member and the end on the side (the opening side) opposite to the root side of the sandwich part.

<Width w of Caulking Part>

The shapes of the plate member (the sandwich parts 51a and 51b) used in the caulking part 51 will now be considered. First, the width w of the plate member will be considered.

FIG. 13 shows a projection plane of a side face of the shape-memory member 15 having an almost cylindrical shape.

As described above, the maximum holding power of holding the shape-memory member 15 of the caulking part 51 is obtained mainly as the product (corresponding to the maximum static frictional force) between the force F generated by elastic deformation of the shape-memory member 15 in the part which comes into contact with the caulking part 51 and the static frictional coefficient μ of the contact part (see FIG. 8).

The force F generated by the elastic deformation of the shape-memory member 15 is equal to a reaction force FR generated by elastic deformation of the caulking part 51 in the contact part. In the contact part, the caulking part 51 starts plastic deformation earlier than the shape-memory member 15. Consequently, it is considered that when the elastic deformation of the caulking part 51 in the contact part becomes the maximum, the reaction force FR becomes the maximum, and the force F becomes the maximum.

In the preferred embodiment, a stress when a permanent elongation of 0.2% (also referred to as "0.2% proof stress" or "proof stress") occurs in the material (stainless steel) used for the caulking part 51 is used as a start point of plastic deformation, and a stress when the elastic deformation amount of the caulking part 51 in the contact part becomes the maximum is assumed to be equal to the proof stress (0.2% proof stress).

When the proof stress J and the static frictional coefficient μ are used, the maximum value Fm of the static frictional force (that is, the maximum static frictional force) acting on the side face of an almost circular cylinder of the shape memory member 15 can be expressed as Equation (1).

$$Fm = \mu \cdot 2 \cdot D \cdot w \cdot J \quad (1)$$

In this case, the normal reaction acting on the entire side face (area π·D·w) in the crimp portion of the shape-memory member 15 having an almost circular cylindrical shape is approximated by 2·D·w·J. Concretely, the shape-memory member 15 having an almost circular cylindrical shape as shown in FIG. 13 is cut into an upper side and a lower side by a cutting plane LS passing through the center axis LX of the shape-memory member 15. It is assumed that the proof stress J is uniformly applied to a projection plane La (having an area=D·w) obtained by projecting the upper side (having an area=π·D·w/2) of the shape-memory member 15 onto a plane parallel to the cutting plane LS and a projection plane Lb (having an area=D·w) obtained by projecting the lower side (having an area=π·D·w/2) of the shape-memory member 15 onto a plane parallel to the cutting plane LS, and the normal reaction of D·w·J acts on each of the projection planes La and Lb.

When the maximum holding power (the maximum static frictional force Fm) exceeds a maximum tensile force Pm (also referred to as "maximum drive force") generated by contracting of the shape-memory member 15, the hand-shake blur correction unit 1 is able to perform a stable driving operation. Therefore, the relation between the maximum holding power (maximum static frictional force Fm) and the maximum tensile force Pm satisfies Fm>Pm and is concretely expressed by the following equation (2).

$$\mu \cdot 2 \cdot D \cdot w \cdot J > Pm \quad (2)$$

By modifying Equation (2), the relation as shown by Equation (3) can be derived with respect to the width w of the plate member.

$$w > Pm/(2 \cdot \mu \cdot D \cdot J) \quad (3)$$

For example, it is understood that when Pm=0.68N, D=38 μm, μ=0.4, and J=0.205 GPa, the width w of the caulking part 51 is preferably larger than 0.11 mm.

As described above, when the caulking part 51 having the width w satisfying the relation expressed by Equation (3) is used, a stable driving operation can be realized.

<Thickness t of Caulking Part>

Next, the thickness t of the caulking part 51 will be considered.

Figure 14:
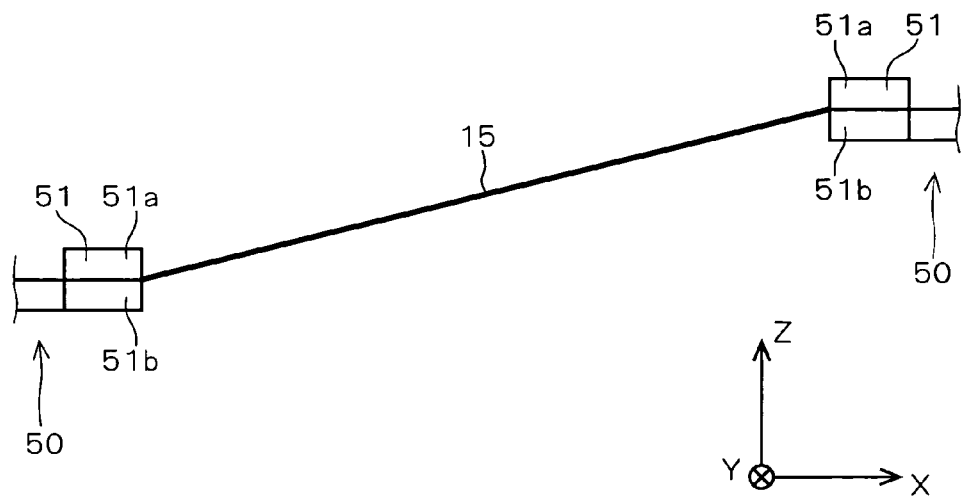
FIG. 14 shows a state where two crimp terminals attached to both ends of the shape-memory member are fixed in positions deviated relative to each other.
Figure 15:
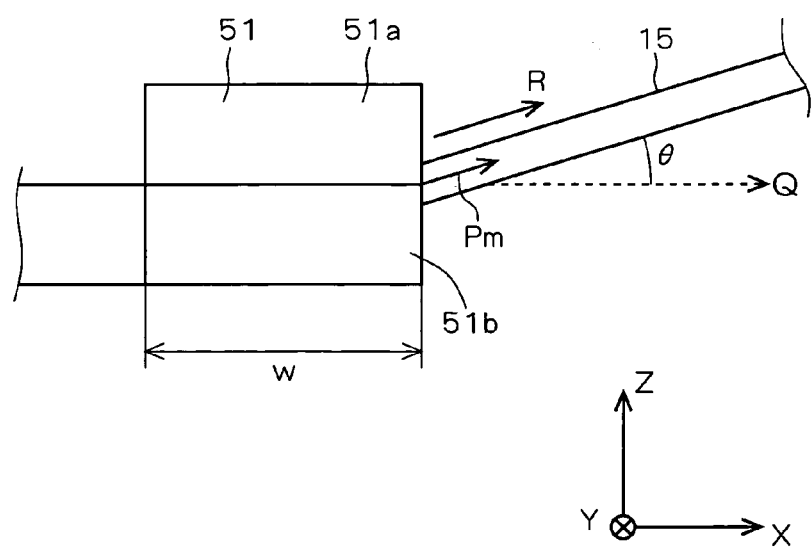
FIG. 15 is an enlarged view of a portion of the caulking part.

FIG. 14 shows a state where two crimp terminals 50 attached to both ends of the shape-memory member 15 are fixed in positions deviated relative to each other. FIG. 15 is an enlarged view of a portion around the caulking part 51. FIG. 16 is a cross-sectional view of the bent portion of the caulking part 51.

Herein, the case of performing driving in a state where the two crimp terminals 50 attached to both ends of the shape-memory member 15 are fixed in the positions deviated relative to each other in the Z axis direction as shown in FIG. 14, in other words, the case where the drive direction R of the shape-memory member 15 (FIG. 15) is not parallel to the sandwich plane of the pair of sandwiching parts 51a and 51b will be considered.

In this case, as shown in FIG. 15, the crimp terminal 50 receives the tensile force Pm in the direction R generated by contracting of the shape-memory member 15, and a component force Pz in the Z axis direction of the tensile force Pm acts so as to open a crimp part (sandwich part) of the caulking part 51 (see FIG. 16). That is, the component force Pz in the Z axis direction of the tensile force Pm acts in the direction of the normal to the sandwich plane of the pair of sandwiching parts so as to separate the pair of sandwiching parts 51a and 51b from each other.

If plastic deformation occurs in the crimp portion of the caulking part 51 due to the action of the component force Pz in the Z axis direction, the holding power by crimping between the shape-memory member 15 and the crimp terminal 50 drops. Consequently, it is preferable that plastic deformation does not occur in the crimp portion of the caulking part 51 due to the action of the component force Pz in the Z axis direction.

The action of the component force Pz in the Z axis direction shown in FIG. 16 exerted on the caulking part 51 will be considered by modeling one of the sandwiching parts 51a and 51b (herein, the sandwiching part 51a) as a cantilever having a thickness t and a width w shown in FIG. 17.

In the model shown in FIG. 17, the distance from the fixed end of the cantilever to a virtual concentrated load point M is expressed as a distance c from a root position TP on the bent part KB side in the bent section to the crimp position (sandwiched position) of the shape-memory member 15 in the bent section. A deflection amount h of the cantilever in the concentrated load point M is expressed by Equation (4) using the thickness t of the cantilever (plate member) (that is, the thickness of the sandwiching part 51a) and the width w (that is, the width of the sandwiching part 51a).

$$h = 4 \cdot Pm \cdot \sin\theta \cdot c^3 / (E \cdot w \cdot t^3) \quad (4)$$

In this equation, Pm denotes the maximum tensile force of the shape-memory member 15, θ denotes the angle formed between the drive direction R of the shape-memory member 15 and the sandwich plane of the pair of sandwiching parts 51a and 51b, and E denotes the Young's modulus of the member used for the caulking part 51.

On the other hand, the maximum elastic deformation amount a just before the crimp portion of the caulking part 51 (sandwiching part 51a) starts plastic deformation due to the component force Pz is expressed by Equation (5) using an elasticity limit strain δ of the caulking part 51 (sandwiching part 51a).

$$\alpha = \delta \cdot t \quad (5)$$

When the deflection amount h of the cantilever (that is, the elastic deformation amount of the crimp portion due to the component force Pz) is smaller than the maximum elastic deformation amount α, the hand-shake blue correction unit 1 can perform a stable driving operation. Therefore, the relation between the deflection amount h of the cantilever and the maximum elastic deformation amount a is expressed as Equation (6).

$$\delta \cdot t > 4 \cdot Pm \cdot \sin\theta \cdot c^3 / (E \cdot w \cdot t^3) \quad (6)$$

By modifying Equation (6), the relation as expressed by Equation (7) can be derived with respect to the thickness t.

$$t^4 > 4 \cdot Pm \cdot \sin\theta \cdot c^3 / (E \cdot w \cdot \delta) \quad (7)$$

That is, in the case where the direction R of the driving force of the shape-memory member 15 and the sandwich plane of the pair of sandwiching parts 51a and 51b form the angle θ and the force of separating the pair of sandwiching parts 51a and 51b from each other by the driving force acts in the direction of the normal to the sandwich plane, preferably, the thickness t of the plate member constructing the sandwiching part 51a satisfies Equation (7). For example, when w=0.6 mm, Pm=0.68N, θ=10°, E=200 GPa, c=0.1 mm, and δ=0.2%, the thickness t of the caulking part 51 is preferably a value larger than 0.04 mm.

In the case where driving is performed in a state where the two crimp terminals 50 attached to the both ends of the shape-memory member 15 are fixed in the position deviated relative to each other (FIG. 14), by using the caulking part 51 having the thickness t satisfying the relation of Equation (7), a stable driving operation can be realized.

<Modifications>

While the preferred embodiment of the present invention has been described so far, the present invention is not limited to the contents described above.

For example in the above preferred embodiment, stainless steel is employed as the material of the caulking parts 51 of the crimp terminals 50 in order to compensate for a reduction in the holding power caused by changing the diameter of the shape-memory member 15. The use of stainless steel as the material of caulking parts allows the use of a drive mechanism using a shape-memory member even in operating environments that require great holding power.

Concretely, when an object to be driven by the above drive mechanism is heavy in weight, the power applied to the shape-memory member during operation increases accordingly. This requires great holding power between the shape-memory member and crimp terminals during drive operation. Thus, the use of stainless steel as the material of caulking parts is an effective way to improve the holding power and thereby to achieve stable drive operation.

While in the preferred embodiment of the present invention, SUS430 and SUS304 are shown as the material of the caulking parts 51 of the crimp terminals 50, the present invention is not limited thereto. For example, other stainless steel such as SUS301 (austenitic stainless steel) may be used. Further, the material is not limited to stainless steel, and it may be nickel with a high Young's modulus E. Or, the caulking parts 51 may be formed of a cold-rolled steel plate (SPCC).

Although the caulking part 51 of the crimp terminal 50 is used as it is without being subject to a predetermined surface process or the like in the preferred embodiment of the present invention, the present invention is not limited to the embodiment. Concretely, it is also possible to use a stainless steel as the material of the caulking part 51 of the crimp terminal 50 and plate the surface of the stainless steel with nickel (Ni).

FIG. 18 shows the maximum holding power in the case where SUS304 is used as the material of the caulking part 51 of the crimp terminal 50 and that in the case where SUS304 is used as the material of the caulking part 51 and the surface of the SUS304 is nickel-plated. Concretely, results of experiments (static load measurement test) conducted three times for each of the cases are shown. The caulking part 51 of the crimp terminal 50 used in the experiments has the thickness t of 0.2 mm and the width w of 1.0 mm. In the experiments shown in FIG. 18, the shape-memory member 15b having the diameter of 38 µm is used and the shape-memory member 15b is crimped in the center portion of the sandwich range v of 0.6 mm.

As shown in FIG. 18, the average of the maximum holding power values in the case of nickel-plating the caulking part 51 is 1.29N (*). On the other hand, the average of the maximum holding power values in the case of using SUS304 as the material of the caulking part 51 is 1.27N (*)

It is understood from the results that a holding power similar to that in the case of using stainless steel as the material of the caulking part 51 can be obtained also in the case of nickel-plating the caulking part 51.

By nickel-plating the caulking part 51, corrosion resistance of the caulking part 51 increases and the shape of the caulking part 51 is maintained for the long term. It stabilizes the shape of the contact part between the caulking part 51 and the shape-memory member 15 and enables the power of holding the shape-memory member 15 and the crimp terminal 50 to be maintained for the long term.

While the invention has been shown and described in detail, the foregoing description is in all aspects illustrative and not restrictive. It is therefore understood that numerous modifications and variations can be devised without departing from the scope of the invention.

What is claimed is:

1. A drive for operating a movable part with respect to a fixed part, comprising:
    a driving member having a linear shape and being made of a shape-memory alloy;
    a crimp terminal for holding one end of said driving member at said fixed part or said movable part, said crimp terminal having a pair of sandwiching parts formed by bending a plate member, said driving member being sandwiched and crimped by said pair of sandwiching parts in a width w of said plate member along a stretch direction of the driving member in a portion where said pair of sandwiching parts face each other, and at least a part to which said driving member is crimped in said crimp terminal being made of stainless steel; and
    a driving circuit for operating said movable part by applying a driving current to said driving member through said crimp terminal,
    wherein
    the width w of said plate member satisfies the following equation:

$w > Pm/(2 \cdot \mu \cdot D \cdot J)$, where Pm denotes a maximum driving force of said driving member, µ denotes a coefficient of static friction between said plate member and said driving member, D denotes a diameter of said driving member, and J denotes proof stress of said plate member.

2. The drive according to claim 1, wherein
    at least the part to which said driving member is crimped in said crimp terminal is plated with nickel.

3. The drive according to claim 1, wherein said driving member is crimped so as to be positioned in a bent section of said plate member between a root position of a bent portion of said plate member and a position halfway between the root position and an end on the side opposite to the root side of said sandwiching part.

4. A drive for operating a movable part with respect to a fixed part, comprising:
    a driving member having a linear shape and being made of a shape-memory alloy;
    a crimp terminal for holding one end of said driving member at said fixed part or said movable part, said crimp terminal having a pair of sandwiching parts formed by bending a plate member, said driving member being sandwiched and crimped by said pair of sandwiching parts in a width w of said plate member along a stretch direction of the driving member in a portion where said pair of sandwiching parts face each other, and at least a part to which said driving member is crimped in said crimp terminal being made of stainless steel; and
    a driving circuit for operating said movable part by applying a driving current to said driving member through said crimp terminal,
    wherein, in the case where a direction of a driving force of said driving member and a sandwich plane of said pair of sandwiching parts form an angle θ and a force of separating said pair of sandwiching parts from each other by said driving force acts in a direction of normal to said sandwich plane, a thickness t of said plate member satisfies the following equation:

$t^4 > 4 \cdot Pm \cdot \sin \theta \cdot c^3 / (E \cdot w \cdot \delta)$, where Pm denotes a maximum drive force of said driving member, c denotes a distance from a root position of a bent portion of said plate member in a bent section of said plate member to a position in which said driving member is sandwiched in the bent section, E denotes a Young's modulus of said plate member, and δ denotes an elasticity limit strain in a part of crimping said driving member.

5. The drive according to claim 4, wherein
    said driving member is crimped so as to be positioned in a bent section of said plate member between a root position of a bent portion of said plate member and a position halfway between the root position and an end on the side opposite to the root side of said sandwiching part.

6. The drive according to claim 4, wherein at least the part to which said driving member is crimped in said crimp terminal is plated with nickel.

7. An optical element actuating device, comprising:
    a correction lens;
    a holding frame for holding said correction lens;
    a first pin being functionally coupled to said holding frame;
    a first crimp terminal having a first pair of sandwiching parts formed by bending a plate member, said first crimp terminal being functionally coupled with said first pin, at least a part of said first crimp terminal being made of stainless steel;
    a second crimp terminal having a second pair of sandwiching parts formed by bending a plate member, at least a part of said second crimp terminal being made of stainless steel;
    a driving member comprising a shape-memory alloy, having a first end and a second end, the first end of said driving member being sandwiched and crimped within said first pair of sandwiching parts, the second end of said driving member being sandwiched and crimped within said second pair of sandwiching parts;

a second pin, being functionally coupled with said second crimp terminal;

an elastic member having a first end and a second end, the first end of said elastic member being functionally coupled to said holding frame, and the second end of said elastic member being operable to be coupled to a fixed member; and a driving circuit for applying a driving current to said driving member through said first crimp terminal;

wherein the width w of said plate member satisfies the following equation:

$$w > Pm/(2 \cdot \mu \cdot D \cdot J),$$

where Pm denotes a maximum driving force of said driving member, $\mu$ denotes a coefficient of static friction between said plate member and said driving member, D denotes a diameter of said driving member, and J denotes proof stress of said plate member.

8. The optical element actuating device according to claim 7, wherein said first crimp terminal is made of stainless steel and said second crimp terminal is made of stainless steel.

9. The optical element actuating device according to claim 8, wherein at least the part of the first crimp terminal and the part of the second crimp terminal which are functionally coupled to said driving member are plated with nickel.

10. An optical element actuating device, comprising:

a correction lens;

a holding frame for holding said correction lens;

a first pin being functionally coupled to said holding frame;

a first crimp terminal having a first pair of sandwiching parts formed by bending a plate member, said first crimp terminal being functionally coupled with said first pin, at least a part of said first crimp terminal being made of stainless steel;

a second crimp terminal having a second pair of sandwiching parts formed by bending a plate member, at least a part of said second crimp terminal being made of stainless steel;

a driving member comprising a shape-memory alloy, having a first end and a second end, the first end of said driving member being sandwiched and crimped within said first pair of sandwiching parts, the second end of said driving member being sandwiched and crimped within said second pair of sandwiching parts;

a second pin, being functionally coupled with said second crimp terminal;

an elastic member having a first end and a second end, the first end of said elastic member being functionally coupled to said holding frame, and the second end of said elastic member being operable to be coupled to a fixed member; and a driving circuit for applying a driving current to said driving member through said first crimp terminal, wherein, in the case where a direction of a driving force of said driving member and a sandwich plane of said pair of sandwiching parts form an angle $\theta$ and a force of separating said pair of sandwiching parts from each other by said driving force acts in a direction of normal to said sandwich plane, a thickness t of said plate member satisfies the following equation:

$$t^4 > 4 \cdot Pm \cdot \sin\theta \cdot c^3/(E \cdot w \cdot \delta),$$

where Pm denotes a maximum drive force of said driving member, c denotes a distance from a root position of a bent portion of said plate member in a bent section of said plate member to a position in which said driving member is sandwiched in the bent section, E denotes a Young's modulus of said plate member, and $\delta$ denotes an elasticity limit strain in a part of crimping said driving member.

11. The optical element actuating device according to claim 10, wherein said first crimp terminal is made of stainless steel and said second crimp terminal is made of stainless steel.

12. The optical element actuating device according to claim 11, wherein at least the part of the first crimp terminal and the part of the second crimp terminal which are functionally coupled to said driving member are plated with nickel.

* * * * *